United States Patent
Bae et al.

(10) Patent No.: US 11,049,434 B2
(45) Date of Patent: Jun. 29, 2021

(54) ELECTRONIC DEVICE AND METHOD FOR CONTROLLING THE ELECTRONIC DEVICE

(71) Applicant: SAMSUNG ELECTRONICS CO., LTD., Suwon-si (KR)

(72) Inventors: Jong-Kon Bae, Seoul (KR); Yo-Han Lee, Seoul (KR); Dong-Hui Kim, Hwaseong-si (KR); Dong-Kyoon Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/492,357

(22) Filed: Apr. 20, 2017

(65) Prior Publication Data
US 2017/0309218 A1 Oct. 26, 2017

(30) Foreign Application Priority Data
Apr. 20, 2016 (KR) .......................... 10-2016-0048289

(51) Int. Cl.
*G09G 3/20* (2006.01)
*G09G 5/36* (2006.01)
(Continued)

(52) U.S. Cl.
CPC ............ *G09G 3/2092* (2013.01); *G09G 3/20* (2013.01); *G09G 5/36* (2013.01); *G09G 5/373* (2013.01);
(Continued)

(58) Field of Classification Search
CPC ....... G09G 2380/02; G09G 2310/0232; G09G 2340/04; G09G 2330/021; G09G 2360/18;
(Continued)

(56) References Cited

U.S. PATENT DOCUMENTS

| | | |
|---|---|---|
| 2002/0190939 A1 | 12/2002 | Knapp et al. |
| 2003/0044081 A1* | 3/2003 | Uesugi ...................... G06T 1/60 382/276 |

(Continued)

FOREIGN PATENT DOCUMENTS

| | | |
|---|---|---|
| CN | 1846247 A | 10/2006 |
| CN | 102005180 A | 4/2011 |

(Continued)

OTHER PUBLICATIONS

Search Report and Written Opinion dated Jul. 20, 2017 in counterpart International Patent Application No. PCT/KR2017/004253.

(Continued)

*Primary Examiner* — Xilin Guo
(74) *Attorney, Agent, or Firm* — Nixon & Vanderhye P.C.

(57) ABSTRACT

An electronic device and a method for controlling the electronic device are provided. The electronic device includes a substantially circular or oval display, a processor configured to generate content, a display driving unit comprising display driving circuitry including a first driver and a second driver, wherein the display driving unit is configured to control driving of the display, to identify a shape of an area of content which is displayed in the display, to identify the shape of the display, to determine a first area of the display in which the content is to be displayed, to determine a second area of the display in which the content is not to be displayed based on at least a result of the identification, to deactivate at least part of the display driving unit, corresponding to the second area, while activating the display driving unit corresponding to the first area.

8 Claims, 12 Drawing Sheets

(51) Int. Cl.
*G09G 5/391* (2006.01)
*G09G 5/373* (2006.01)
*G06F 3/147* (2006.01)

(52) U.S. Cl.
CPC ............. *G09G 5/391* (2013.01); *G06F 3/147* (2013.01); *G09G 2310/0232* (2013.01); *G09G 2320/08* (2013.01); *G09G 2330/021* (2013.01); *G09G 2340/04* (2013.01); *G09G 2340/0442* (2013.01)

(58) Field of Classification Search
CPC ............. G09G 2370/08; G09G 3/2003; G09G 3/2096; G09G 2320/0295; G09G 3/3648; G09G 2310/027; G09G 3/2092; G09G 3/3225; G09G 3/3688; G09G 2310/08; G09G 3/006; G09G 2300/0842; G09G 5/373; G09G 2340/0464; G09G 3/20; G09G 3/3266; G09G 5/391; G09G 5/36; G09G 2340/0442; G09G 2340/14; G06F 3/0412; G06F 11/328; G06F 3/01; G06F 1/3218; G06F 1/3265; G06F 3/147; G06F 3/0625; G06F 13/3668; G06F 13/1668; G06F 3/0683; G06F 13/1694; G06F 11/3466; G06F 13/1636; G06F 13/1657; G06F 13/1663; G06F 16/23; G06F 3/04886; G06F 1/1652; G06F 21/84; G06F 5/373; G06F 2340/0464; G06F 2320/08; G06F 2340/04; G06F 3/1423; G06F 3/14; G06T 7/13; G11C 11/2273; G11C 11/419; G11C 11/4087; G11C 11/4085; G11C 16/0483; G11C 13/0069
See application file for complete search history.

(56) References Cited

U.S. PATENT DOCUMENTS

| 2005/0057539 | A1 | 3/2005 | Ong | |
|---|---|---|---|---|
| 2005/0073526 | A1* | 4/2005 | Nose | G09G 3/3688 345/531 |
| 2006/0227292 | A1* | 10/2006 | Lawrence | G03B 21/26 353/28 |
| 2011/0050751 | A1 | 3/2011 | Park et al. | |
| 2014/0253419 | A1 | 9/2014 | Tanada | |
| 2015/0054800 | A1 | 2/2015 | Kim et al. | |
| 2015/0185781 | A1 | 7/2015 | Yu et al. | |
| 2015/0194131 | A1 | 7/2015 | Kim et al. | |
| 2015/0348495 | A1 | 12/2015 | Kim et al. | |
| 2015/0370317 | A1 | 12/2015 | Cha | |
| 2016/0027380 | A1 | 1/2016 | Kim et al. | |
| 2016/0189601 | A1* | 6/2016 | Jung | G09G 3/20 345/212 |
| 2016/0307534 | A1 | 10/2016 | Wu | |
| 2018/0330468 | A1* | 11/2018 | Mao | G06T 1/60 |

FOREIGN PATENT DOCUMENTS

| CN | 105096845 A | 11/2015 |
|---|---|---|
| CN | 104732936 A | 10/2016 |
| KR | 10-0871366 | 12/2008 |
| KR | 10-2011-0066333 A | 6/2011 |
| KR | 10-2015-0029182 | 3/2015 |
| KR | 10-2015-0024073 | 6/2015 |
| KR | 10-2015-0076889 | 7/2015 |
| KR | 10-2015-0081765 | 7/2015 |
| KR | 10-2015-0145583 | 12/2015 |

OTHER PUBLICATIONS

European Search Report for EP Application No. 17786199.4 dated Feb. 12, 2019.

Chinese Office Action dated Dec. 21, 2020 for CN Application No. 201780021177.1.

* cited by examiner

ELECTRONIC DEVICE AND METHOD FOR CONTROLLING THE ELECTRONIC DEVICE

CROSS-REFERENCE TO RELATED APPLICATION

This application is based on and claims priority under 35 U.S.C. § 119 to a Korean patent application filed in the Korean Intellectual Property Office on Apr. 20, 2016 and assigned Serial No. 10-2016-0048289, the disclosure of which is incorporated by reference herein in its entirety.

TECHNICAL FIELD

The present disclosure relates generally to an electronic device, and for example, to an electronic device for displaying content based on the shape of a display, and a method for controlling the electronic device.

BACKGROUND

Techniques for displaying various types of content on a smartphone with a large screen have recently been developed. A user may view played content on a wide screen (for example, a rectangular screen) in any place at any time.

Recently, wearable devices (for example, wearable watches) other than large-screen smartphones have been developed. A wearable device may display content on a small screen relative to the screen of a smartphone.

Although the screen of a wearable device is typically rectangular, it may also be shaped into a circle or substantially circular shape according to the typical shape of a watch.

A conventional wearable device with a circular screen should display, on the limited circular screen, content supposed to be reproduced on an existing rectangular smart phone, and some part of a rectangular content area is not displayed on the limited circular screen. As a consequence, a user of the wearable device suffers from unnecessary power consumption of the wearable device.

The above information is presented as background information only to assist with an understanding of the present disclosure.

SUMMARY

An example aspect of the present disclosure addresses at least the above-mentioned problems and/or disadvantages and provides at least the advantages described below. Accordingly, an example aspect of the present disclosure provides an electronic device for displaying content of a first shape on a display of a second shape different from the first shape, while reducing operational power consumption.

In accordance with an example aspect of the present disclosure, an electronic device is provided. An electronic device includes a substantially circular or oval display, a processor configured to generate content, a display driving unit comprising display driving circuitry including a first driver and a second driver, wherein the display driving unit is configured to control driving of the display, to identify a shape of an area of content which is displayed in the display, to identify the shape of the display, to determine a first area of the display in which the content is to be displayed, to determine a second area of the display in which the content is not to be displayed based on at least a result of the identification, to deactivate at least part of the first driver corresponding to the first area and the second driver corresponding to the second area.

In accordance with another example aspect of the present disclosure, a method of controlling an electronic device including a display, a display driving unit comprising display driving circuitry including a first driver and a second driver, for controlling driving of the display, and a memory for storing content to be displayed on the display, the method comprising, identifying a shape of an area of content which is displayed in the display, identifying a shape of the display, determining a first area of the display in which the content is to be displayed and a second area of the display in which the content is not to be displayed based on at least a result of the identification; and deactivating at least part of the display driving unit, corresponding to the second area, while activating the display driving unit corresponding to the first area.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features and attendant advantages of the present disclosure will be more apparent and readily appreciated from the following detailed description, taken in conjunction with the accompanying drawings, in which like reference numerals refer to like elements, and wherein.

Throughout the drawings, like reference numerals will be understood to refer to like parts, components, and structures.

DETAILED DESCRIPTION

Figure 1:
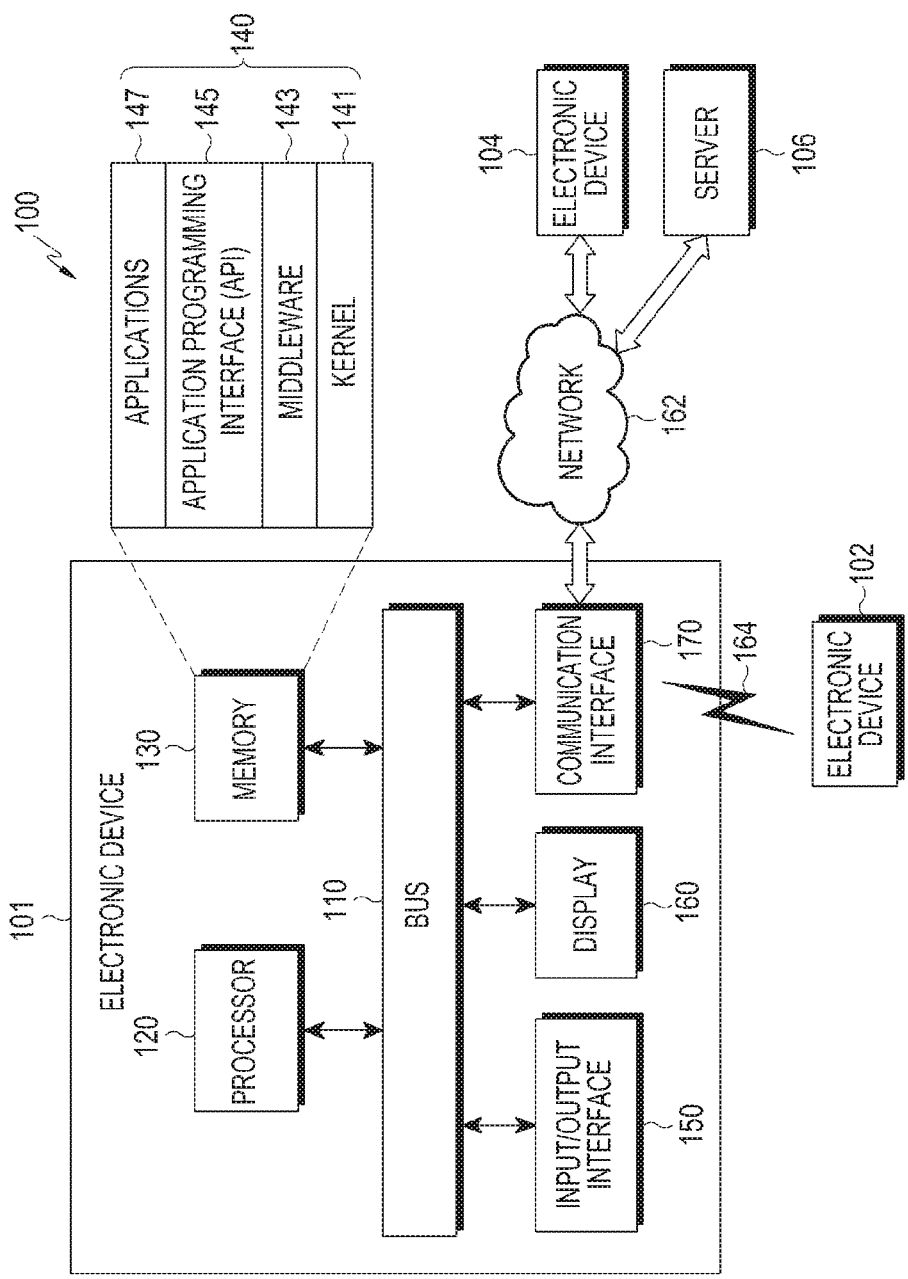
FIG. 1 is a diagram illustrating an example network environment in which a plurality of electronic devices are used according to various example embodiments of the present disclosure.

Various example embodiments of the present disclosure are described with reference to the accompanying drawings. However, the example embodiments and terms as used herein are not intended to be limited to the particular embodiments and it is to be understood that the present disclosure covers various modifications, equivalents, and/or alternatives falling within the scope and spirit of the present disclosure. In relation to a description of the drawings, like reference numerals typically denote the same components. In the present disclosure, the term 'A or B', or 'at least one of A or/and B' may cover all possible combinations of enumerated items. The term as used in the present disclosure, 'first' or 'second' may modify the names of components irrespective of sequence or importance. These expressions are used to distinguish one component from another component, not limiting the components. When it is said that a component (for example, a first component) is '(operatively or communicatively) coupled with/to' or 'connected to' another component (for example, a second component), it should be understood that the one component is connected to the other component directly or through any other component (for example, a third component).

The term 'configured to' as used herein may be replaced with, for example, the term 'suitable for' 'having the capacity to', 'designed to', 'adapted to', 'made to', or 'capable of' in hardware or software. The term 'configured to' may refer, for example, to a situation in which a device is 'capable of' with another device or part. For example, 'a processor configured to execute A, B, and C' may refer, for example, to a dedicated processor (for example, an embedded processor) for performing the corresponding operations or a generic-purpose processor (for example, a central processing unit (CPU) or an application processor (AP)) for performing the operations.

According to various example embodiments of the present disclosure, an electronic device may be at least one of, for example, a smart phone, a tablet personal computer (PC), a mobile phone, a video phone, an e-Book reader, a desktop PC, a laptop PC, a netbook computer, a workstation, a server, a personal digital assistant (PDA), a portable multimedia player (PMP), an MP3 player, medical equipment, a camera, or an wearable device, or the like, but is not limited thereto. The wearable device may be at least one of an accessory type (for example, a watch, a ring, a bracelet, an ankle bracelet, a necklace, glasses, contact lenses, or a head-mounted device (HMD)), a fabric or clothes type (for example, electronic clothes), an attached type (for example, a skin pad or a tattoo), or an implantable type (for example, an implantable circuit), or the like, but is not limited thereto. According to some example embodiments, an electronic device may be at least one of a television (TV), a digital versatile disk (DVD) player, an audio player, a refrigerator, an air conditioner, a vacuum cleaner, an oven, a microwave oven, a washer, an air purifier, a set-top box, a home automation control panel, a security control panel, a media box (for example, Samsung HomeSync™, Apple TV™, Google TV™, or the like), a game console (for example, Xbox™, PlayStation™, or the like), an electronic dictionary, an electronic key, a camcorder, or an electronic picture frame, or the like, but is not limited thereto.

According to other example embodiments, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, a drone, an automatic teller machine (ATM) in a financial facility, a point of sales (POS) device in a shop, or an Internet of things (IoT) device (for example, a lighting bulb, various sensors, a sprinkler, a fire alarm, a thermostat, a street lamp, a toaster, sports goods, a hot water tank, a heater, or a boiler), or the like, but is not limited thereto. According to some example embodiments, an electronic device may be at least one of furniture, part of a building/structure or a vehicle, an electronic board, an electronic signature receiving device, a projector, and various measuring devices (for example, water, electricity, gas or electro-magnetic wave measuring devices), or the like, but is not limited thereto. According to various embodiments, an electronic device may be flexible or a combination of two or more of the foregoing devices. According to an embodiment of the present disclosure, an electronic device is not limited to the foregoing devices. In the present disclosure, the term 'user' may refer to a person or device (for example, artificial intelligence electronic device) that uses an electronic device.

Referring to FIG. 1, an electronic device 101 in a network environment 100 according to various example embodiments is described. The electronic device 101 may include a bus 110, a processor (e.g., including processing circuitry) 120, a memory 130, an input/output (I/O) interface (e.g., including interface circuitry) 150, a display 160, and a communication interface (e.g., including communication circuitry) 170. In some embodiments, at least one of the components may be omitted in the electronic device 101 or a component may be added to the electronic device 101.

The bus 110 may include a circuit that interconnects, the foregoing components 120, 130, 150, 160, and 170 and allows communication (for example, control messages and/or data) between the foregoing components.

The processor 120 may include various processing circuitry, such as, for example, and without limitation, one or more of a dedicated processor, a CPU, an AP, or a communication processor (CP). The processor 120 may, for example, execute computation or data processing related to control and/or communication of at least one other component of the electronic device 101. The processor 120 may be called a controller.

The memory 130 may include a volatile memory and/or a non-volatile memory. The memory 130 may, for example, store instructions or data related to at least one other component of the electronic device 101. According to an embodiment, the memory 130 may store software and/or programs 140. The programs 140 may include, for example, a kernel 141, middleware 143, an application programming interface (API) 145, and/or application programs (or applications) 147. At least a part of the kernel 141, the middleware 143, and the API 145 may be called an operating system (OS). The kernel 141 may control or manage system resources (for example, the bus 110, the processor 120, or the memory 130) that are used in executing operations or functions implemented in other programs (for example, the middleware 143, the API 145, or the application programs 147). Also, the kernel 141 may provide an interface for allowing the middleware 143, the API 145, or the application programs 147 to access individual components of the electronic device 101 and control or manage system resources.

The middleware 143 may serve as a medium through which the kernel 141 may communicate with, for example, the API 145 or the application programs 147 to transmit and receive data. Also, the middleware 143 may process one or more task requests received from the application programs 147 according to their priority levels. For example, the middleware 143 may assign priority levels for using system resources (the bus 110, the processor 120, or the memory 130) of the electronic device 101 to at least one of the application programs 147, and process the one or more task requests according to the priority levels. The API 145 is an interface for the applications 147 to control functions that the kernel 141 or the middleware 143 provides. For example, the API 145 may include at least one interface or function (for example, a command) for file control, window control, video processing, or text control. The I/O interface 150 may, for example, provide a command or data received from a user or an external device to the other component(s) of the electronic device 101, or output a command or data received from the other component(s) of the electronic device 101 to the user or the external device.

The display 160 may include, for example, a liquid crystal display (LCD), a light emitting diode (LED) display, an organic LED (OLED) display, a microelectromechanical systems (MEMS) display, or an electronic paper display, or the like, but is not limited thereto. The display 160 may display, for example, various types of content (for example, text, an image, a video, an icon, and/or a symbol) to the user. The display 160 may include a touch screen and receive, for example, a touch input, a gesture input, a proximity input, or a hovering input through an electronic pen or a user's body part.

The communication interface 170 may include various communication circuitry and establish communication, for example, between the electronic device 101 and an external device (for example, a first external electronic device 102, a second external electronic device 104, or a server 106). For example, the communication interface 170 may be connected to a network 162 by wireless communication or wired communication, and communicate with the external device (for example, the second external electronic device 104 or the server 106) over the network 162. The communication interface 170 may, for example, also be connected to an electronic device (e.g., 102) via a short-range wireless communication connection 164.

The wireless communication may include cellular communication conforming to, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM). According to an embodiment, the wireless communication may include, for example, at least one of wireless fidelity (WiFi), Bluetooth, Bluetooth low energy (BLE), Zigbee, near field communication (NFC), magnetic secure transmission (MST), radio frequency (RF), or body area network (BAN). According to an embodiment, the wireless communication may include GNSS. GNSS may be, for example, global positioning system (GPS), global navigation satellite system (Glonass), Beidou navigation satellite system (hereinafter, referred to as 'Beidou'), or Galileo, the European global satellite-based navigation system. In the present disclosure, the terms 'UPS' and 'GNSS' are interchangeably used with each other. The wired communication may be conducted in conformance to, for example, at least one of universal serial bus (USB), high definition multimedia interface (HDMI), recommended standard 232 (RS-232), power line communication, or plain old telephone service (POTS). The network 162 may be a telecommunication network, for example, at least one of a computer network (for example, local area network (LAN) or wide area network (WAN)), the Internet, or a telephone network.

Each of the first and second external electronic devices 102 and 104 may be of the same type as or a different type from the electronic device 101. According to various embodiments, all or a part of operations performed in the electronic device 101 may be performed in one or more other electronic devices (for example, the electronic devices 102 and 104) or the server 106. According to an embodiment, if the electronic device 101 is to perform a function or a service automatically or upon request, the electronic device 101 may request at least a part of functions related to the function or the service to another device (for example, the electronic device 102 or 104 or the server 106), instead of performing the function or the service autonomously, or additionally. The other electronic device (for example, the electronic device 102 or 104 or the server 106) may execute the requested function or an additional function and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
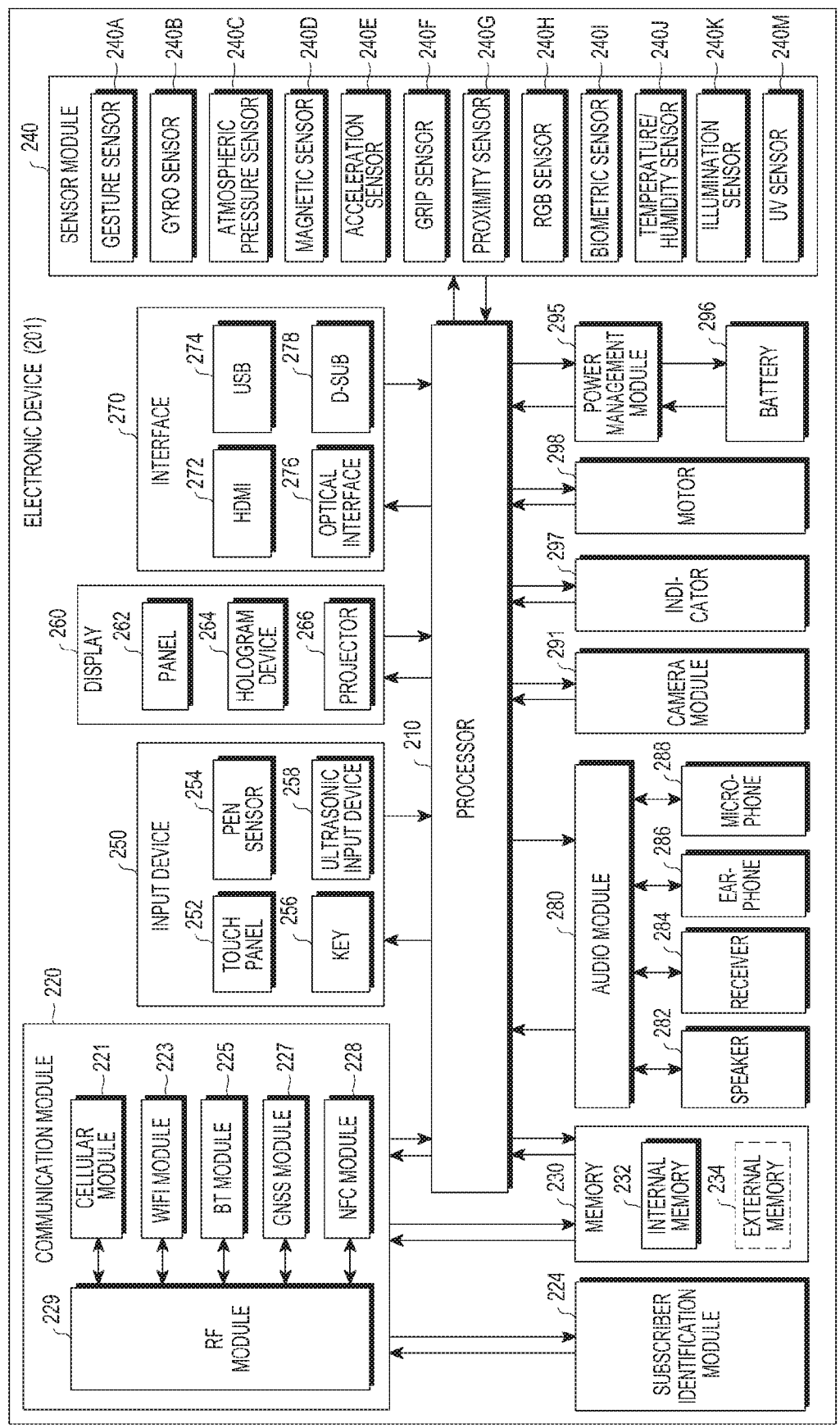
FIG. 2 is a block diagram illustrating an example electronic device according to various example embodiments of the present disclosure.

FIG. 2 is a block diagram illustrating an example electronic device 201 according to various example embodiments of the present disclosure. The electronic device 201 may include, for example, the whole or part of the electronic device 101 illustrated in FIG. 1. The electronic device 201 may include at least one processor (for example, AP) (e.g., including processing circuitry) 210, a communication module (e.g., including communication circuitry) 220, a subscriber identification module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and may, for example, control a plurality of hardware or software components that are connected to the processor 210 by executing an OS or an application program, and may perform processing or computation of various types of data. The processor 210 may be implemented, for example, as a system on chip (SoC). According to an embodiment, the processor 210 may further include a graphics processing unit (GPU) and/or an image signal processor. The processor 210 may include at least a part (for example, a cellular module 221) of the components illustrated in FIG. 2. The processor 210 may load a command or data received from at least one of other components (for example, a non-volatile memory), process the loaded command or data, and store result data in the non-volatile memory.

The communication module 220 may have the same configuration as or a similar configuration to the communication interface illustrated in FIG. 1 (for example, the communication interface 170). The communication module 220 may include various communication circuitry, such as, for example, and without limitation, the cellular module 221, a WiFi module 223, a Bluetooth (BT) module 225, a GNSS module 227, an NFC module 228, and an RF module 229. The cellular module 221 may provide services such as voice call, video call, text service, or the Internet service, for example, through a communication network. According to an embodiment, the cellular module 221 may identify and authenticate the electronic device 201 within a communication network, using the SIM (for example, a SIM card) 224. According to an embodiment, the cellular module 221 may perform at least a part of the functionalities of the processor 210. According to an embodiment, the cellular module 221 may include a CP. According to an embodiment, at least a part (for example, two or more) of the cellular module 221, the WiFi module 223, the BT module 225, the GNSS module 227, or the NFC module 228 may be included in a single integrated chip (IC) or IC package. The RF module 229 may transmit and receive, for example, communication signals (for example, RF signals). The RF module 229 may include, for example, a transceiver, a power amplifier module (PAM), a frequency filter, a low noise amplifier (LNA), an antenna, or the like. According to another embodiment, at least one of the cellular module 221, the WiFi module 223, the BT module 225, the GNSS module 227, or the NFC module 228 may transmit and receive RF signals via a separate RF module.

The SIM 224 may include, for example, a card including the SIM and/or an embedded SIM. The SIM 224 may include a unique identifier (for example, integrated circuit card identifier (ICCID)) or subscriber information (for example, international mobile subscriber identity (IMSI)).

The memory 230 (for example, the memory 130) may include, for example, an internal memory 232 and/or an external memory 234. The internal memory 232 may be at least one of, for example, a volatile memory (for example, dynamic RAM (DRAM), static RAM (SRAM), or synchronous dynamic RAM (SDRAM)), and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory, a hard drive, and a solid state drive (SSD). The external memory 234 may include a flash drive such as a compact flash (CF) drive, a secure digital (SD), a micro secure digital (micro-SD), a mini secure digital (mini-SD), an extreme digital (xD), a multi-media card (MMC), or a memory stick. The external memory 234 may be operatively or physically coupled to the electronic device 201 via various interfaces.

The sensor module 240 may, for example, measure physical quantities or detect operational states of the electronic device 201, and convert the measured or detected information into electrical signals. The sensor module 240 may include at least one of, for example, a gesture sensor 240A, a gyro sensor 240B, an atmospheric pressure sensor 240C, a magnetic sensor 240D, an accelerometer (e.g., acceleration) sensor 240E, a grip sensor 240F, a proximity sensor 240G, a color sensor (for example, a red, green, blue (RGB) sensor) 240H, a biometric sensor 240I, a temperature/humidity sensor 240J, an illumination sensor 240K, or an ultra violet (UV) sensor 240M. Additionally or alternatively, the sensor module 240 may include, for example, an electrical-nose (E-nose) sensor, an electromyogram (EMG) sensor, an electroencephaloeram (EEG) sensor, an electrocardiogram (ECG) sensor, an infrared (IR) sensor, an iris sensor, and/or a finger print sensor. The sensor module 240 may further include a control circuit for controlling one or more sensors included therein. According to some embodiments, the electronic device 201 may further include a processor configured to control the sensor module 240, as a part of or separately from the processor 210. Thus, while the processor 210 is in a sleep state, the control circuit may control the sensor module 240.

The input device 250 may include various input circuitry, such as, for example, and without limitation, a touch panel 252, a (digital) pen sensor 254, a key 256, or an ultrasonic input device 258. The touch panel 252 may operate in at least one of, for example, capacitive, resistive, infrared, and ultrasonic schemes. The touch panel 252 may further include a control circuit. The touch panel 252 may further include a tactile layer to thereby provide haptic feedback to the user. The (digital) pen sensor 254 may include, for example, a detection sheet which is a part of the touch panel or separately configured from the touch panel. The key 256 may include, for example, a physical button, an optical key, or a keypad. The ultrasonic input device 258 may sense ultrasonic signals generated by an input tool using a microphone (for example, a microphone 288), and identify data corresponding to the sensed ultrasonic signals.

The display 260 (for example, the display 160) may include a panel 262, a hologram device 264, a projector 266, and/or a control circuit for controlling them. The panel 262 may be configured to be, for example, flexible, transparent, or wearable. The panel 262 and the touch panel 252 may be implemented as one or more modules. According to an embodiment, the panel 262 may include a pressure sensor (or a force sensor) for measuring the strength of the pressure of a user touch. The pressure sensor may be integrated with the touch panel 252, or configured as one or more sensors separately from the touch panel 252. The hologram device 264 may utilize the interference of light waves to provide a three-dimensional image in empty space. The projector 266 may display an image by projecting light on a screen. The screen may be positioned, for example, inside or outside the electronic device 201.

The interface 270 may include various interface circuitry, such as, for example, and without limitation, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD/multimedia card (MMC) interface, or an infrared data association (IrDA) interface.

The audio module 280 may, for example, convert a sound to an electrical signal, and vice versa. At least a part of the components of the audio module 280 may be included, for example, in the I/O interface 145 illustrated in FIG. 1. The audio module 280 may process sound information input into, or output from, for example, a speaker 282, a receiver 284, an earphone 286, or the microphone 288. The camera module 291 may capture, for example, still images and a video. According to an embodiment, the camera module 291 may include one or more image sensors (for example, a front sensor or a rear sensor), a lens, an image signal processor (ISP), or a flash (for example, an LED or a xenon lamp). The power management module 295 may manage power of, for example, the electronic device 201. According to an embodiment, the power management module 295 may include a power management integrated circuit (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 296. The battery 296 may include, for example, a rechargeable battery and/or a solar battery.

The indicator 297 may indicate specific states of the electronic device 201 or a part of the electronic device 201 (for example, the processor 210), for example, boot status, message status, or charge status. The electronic device 201 may include, for example, a mobile TV support device (for example, a GPU) for processing media data compliant with, for example, digital multimedia broadcasting (DMB), digital video broadcasting (DVB), or MediaFLO™. Each of the above-described components of the electronic device may include one or more parts and the name of the component may vary with the type of the electronic device. According to various embodiments, some component may be omitted from or added to the electronic device (for example, the electronic device 201). Or one entity may be configured by combining a part of the components of the electronic device, to thereby perform the same functions of the components prior to the combining.

Figure 3:
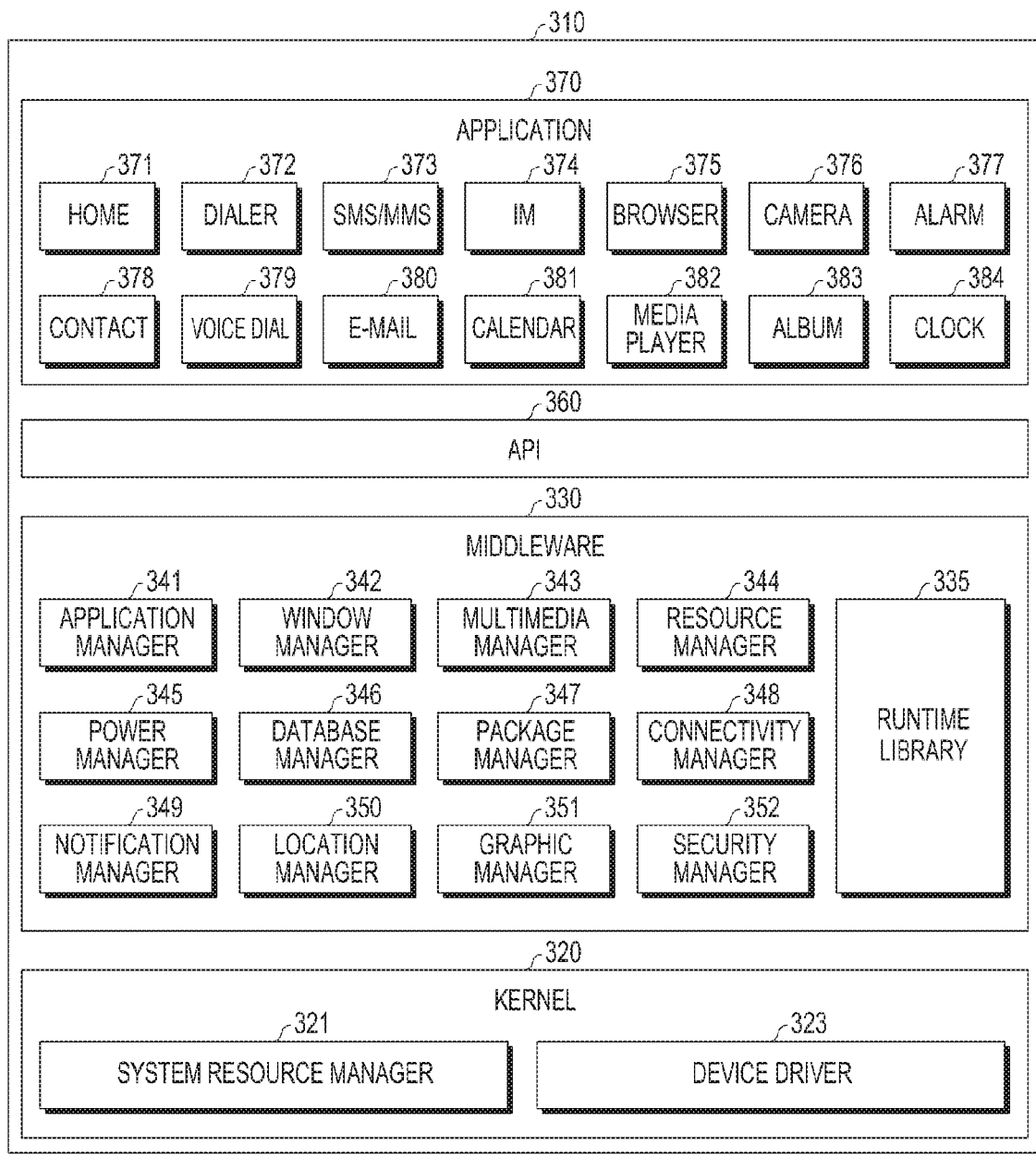
FIG. 3 is a block diagram illustrating an example programming module according to various example embodiments of the present disclosure.

FIG. 3 is a block diagram illustrating an example programming module according to various example embodiments of the present disclosure. According to an embodiment, a programming module 310 (for example, a program 140) may include an OS that controls resources related to an electronic device (for example, the electronic device 101) and/or various applications executed on the OS (for example, the application programs 147). For example, the OS may be Android™, iOS™, Windows™, Symbian™, Tizen™, or Bada™.

Referring to FIG. 3, the programming module 310 may include a kernel 320 (for example, the kernel 141), middleware 330 (for example, the middleware 143), an application programming interface (API) 360 (for example, the API 145), and/or applications 370 (for example, the application programs 147). At least a part of the programming module 310 may be preloaded on the electronic device or downloaded from an external electronic device (for example, the electronic device 102 or 104, or the server 106).

The kernel 320 may include, for example, a system resource manager 321 and/or a device driver 323. The system resource manager 321 may control, allocate, or deallocate system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may, for example, provide a function required commonly for the applications 370 or provide various functionalities to the applications 370 through the API 360 so that the applications 370 may use limited system resources available within the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The runtime library 335 may include, for example, a library module that a complier uses to add a new function in a programming language during execution of an application 370. The runtime library 335 may perform input/output management, memory management, or arithmetic function processing. The application manager 341 may manage, for example, the life cycle of the applications 370. The window manager 342 may manage GUI resources used for a screen. The multimedia manager 343 may determine formats required to play back media files and may encode or decode a media file using a CODEC suitable for the format of the media file. The resource manager 344 may manage a source code or a memory space. The power manager 345 may, for example, manage a battery or a power source and provide power information required for an operation of the electronic device. According to an embodiment, the power manager 345 may interact with a BIOS. The database manager 346 may, for example, generate, search, or modify a database to be used for the applications 370. The package manager 347 may manage installation or update of an application distributed as a package file.

The connectivity manager 348 may manage, for example, wireless connectivity. The notification manager 349 may provide a user with an event such as message arrival, a schedule, a proximity notification, or the like. The location manager 350 may, for example, mange position information about the electronic device. The graphic manager 351 may, for example, manage graphical effects to be provided to the user or related user interfaces. The security manager 352 may, for example, provide system security or user authentication. In an embodiment, the middleware 330 may include a telephony manager to manage a voice or video call function of the electronic device, or a middleware module for combining functions of the above-described components. According to an embodiment, the middleware 330 may provide a customized module for each OS type. The middleware 330 may dynamically delete a part of the existing components or add a new component.

The API 360 may, for example, be a set of API programming functions, which may be configured differently according to an OS. For example, in the case of Android or iOS, one API set may be provided per platform, whereas in the case of Tizen, two or more API sets may be provided per platform.

The applications 370 may include home 371, dialer 372, short message service/multimedia messaging service (SMS/MMS) 373, instant message (IM) 374, browser 375, camera 376, alarm 377, contacts 378, voice dial 379, email 380, calendar 381, media player 382, album 383, clock 384, health care (for example, measurement of an exercise amount or a glucose level), or an application for providing environment information (for example, information about atmospheric pressure, humidity, or temperature). According to an embodiment, the applications 370 may include an information exchange application capable of supporting information exchange between the electronic device and an external electronic device. The information exchange application may include, for example, a notification relay application for transmitting specific information to the external electronic device or a device management application for managing the external electronic device. For example, the notification relay application may transmit notification information generated from another application to the external electronic device, or receive notification information from the external electronic device and transmit the received notification information to a user. The device management application may, for example, install, delete, or update functions of the external electronic device communicating with the electronic device (for example, turn-on/turn-off of the external electronic device (or a part of its components) or control of the brightness (or resolution) of the display), or an application executed in the external electronic device. According to an embodiment, the applications 370 may include (an application (for example, a health care application of a mobile medical equipment) designated according to a property of the external electronic device. According to an embodiment, the applications 370 may include an application received from an external electronic device. At least a part of the programming module 310 may be realized (for example, implemented) in software, firmware, hardware (for example, the processor 210), or a combination of at least two of them, and may include a module, a program, a routine, a set of instructions, or a process to execute one or more functions.

The term "module" as used herein includes a unit including hardware, software, and/or firmware and any combinations thereof. The term "module" may be used interchangeably with other terms, for example, logic, logical block, part, or circuit. A "module" may be the smallest unit for performing one or more functions, or a portion thereof. A "module" may be implemented mechanically, or electronically. For example, a "module" may include, for example, and without limitation, a known, or to-be-developed, dedicated processor, CPU, application-specific integrated circuit (ASIC) chip, field-programmable gate array (FPGA) or programmable logic device that performs certain operations. At least a part of devices (for example, modules or their functions) or methods (for example, operations) according to various embodiments may be implemented as commands stored in a computer-readable storage medium (for example, the memory 130). When the commands are executed by a processor (for example, the processor 120), the processor may execute functions corresponding to the commands. The computer-readable storage medium may include hard disk, floppy disk, magnetic media (for example, magnetic tape), optical media (for example, compact disc read-only memory (CD-ROM)), digital versatile disc (DVD), magneto-optical media (for example, floptical disk)), an internal memory, or the like. Program instructions may include a code produced by a compiler or a code executed by an interpreter. A module or a programming module according to various embodiments of the present disclosure may include one or more of the above-described components, may omit a portion thereof, or may include additional components. Operations that are performed by a module, a programming module or other components according to the present disclosure may be processed in a serial, parallel, repetitive or heuristic manner. Or some operations may be performed in a different order or omitted, or other operations may be added.

Figure 4:
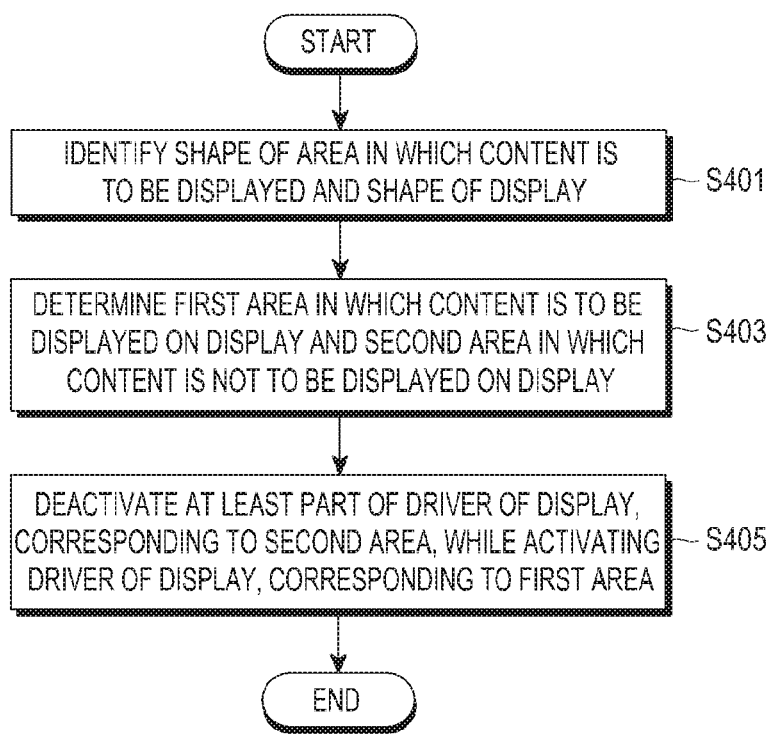
FIG. 4 is a flowchart illustrating an example method of controlling an electronic device according to various example embodiments of the present disclosure.
Figure 5:
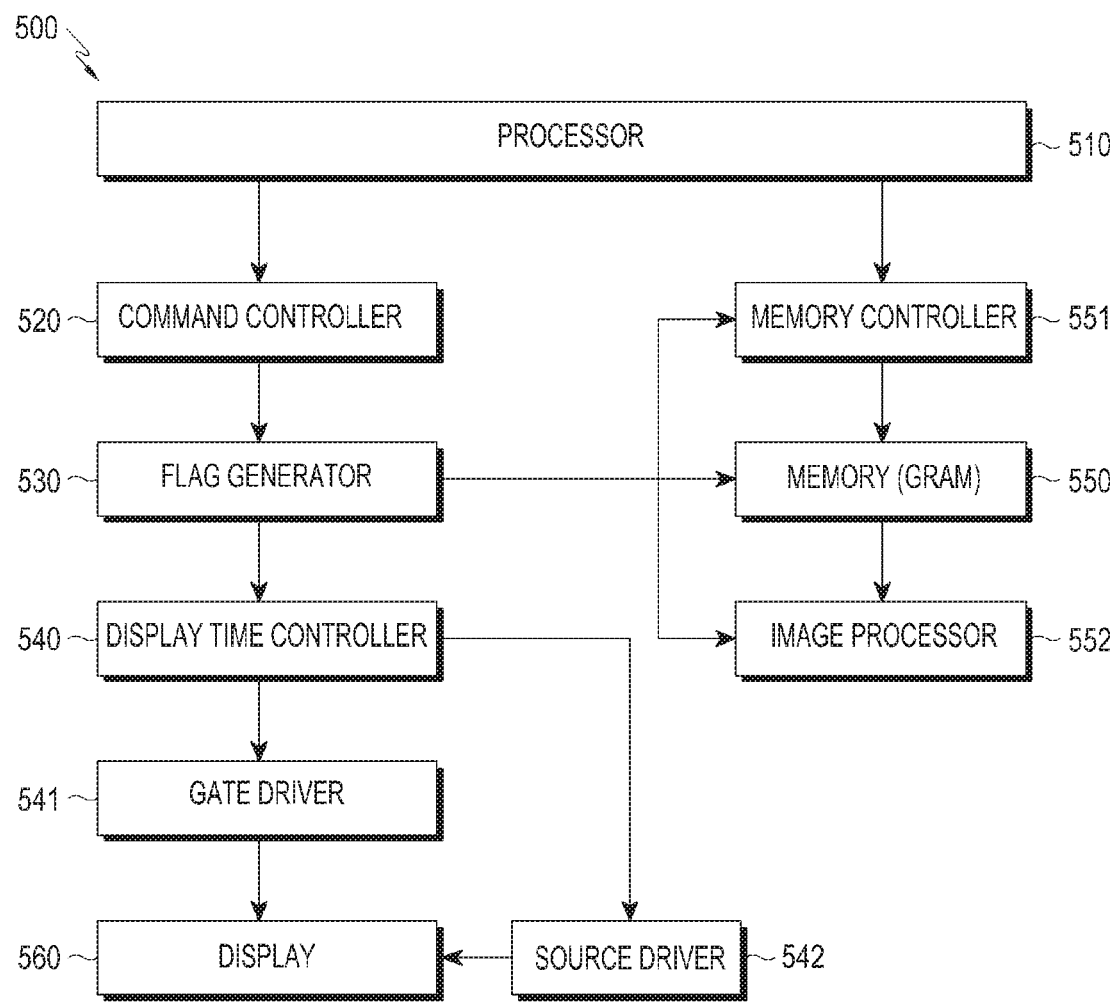
FIG. 5 is a block diagram illustrating example components of an example electronic device according to various example embodiments of the present disclosure.

FIG. 4 is a flowchart illustrating an example method of controlling an electronic device according to various example embodiments of the present disclosure, and FIG. 5 is a block diagram illustrating example components of an electronic device according to various example embodiments of the present disclosure.

Referring to FIGS. 4 and 5, according to various embodiments, a processor 510 of an electronic device 500 may identify the shape of an area in which content is supposed to be displayed and the shape of a display 560 in operation S401. For example, the shape of the display 560 may be a circle, an oval, a diamond, a regular polygon, or a polygon.

For example, the display driving unit may identify that the area in which the content is to be displayed is square, and the display 560 is, for example, circular, and compare the square area in which the content is to be displayed with the circular area of the display 560.

According to various embodiments, the display driving unit may determine a first area of content to be displayed on the display 560, and a second area of the content not to be displayed on the display 560 in operation S403.

For example, the display driving unit may determine a circular first area of a rectangular area in which content is to be displayed, which will be displayed on the circular display 560, and a second area being the remaining area of the rectangular area in which the content is to be displayed.

According to various embodiments, while activating drivers (for example, a gate driver 541 and a source driver 542) of the display 560 corresponding to the first area, the display driving unit may deactivate at least part of the drivers 541 and 542 (for example, at least part of the source driver 542) of the display 560 corresponding to the second area in operation S405.

For example, the display driving unit may generate content to be displayed, and provide the generated content to a command controller 520 and a memory controller 551 in a display driving unit. For example, the display driving unit may transmit information about a result of comparing the shape of an area in which the content is to be displayed with the shape of the display 560, along with the content to the command controller 520 and/or the memory controller 551.

For example, the command controller 520 may transmit, to a flag generator 530 of the display driving unit, a control signal for generating a flag by which to distinguish the first area of the area in which the content is to be displayed, to be displayed on the display 560 from the second area of the area in which the content is to be displayed, not to be displayed on the display 560.

For example, the flag generator 530 may generate a flag for distinguishing the first area from the second area based on the control signal, and transmit the generated flag to a display time controller 540, a memory controller 551, a memory 550 (graphics random access memory (GRAM)), and/or an image processor 552 in the display driving unit.

For example, the display time controller 540 may output the content to the display 560 through the gate driver 541 and the source driver 542 based on the received flag. For example, the display time controller 540 may apply a plurality of timing signals using the gate driver 541 and apply a data signal for each of the timing signals using the source driver 542, based on the received flag. For example, while activating one or more transistors corresponding to the first area at each timing signal among at least one transistor of the source driver 542, the display time controller 540 may deactivate one or more other transistors corresponding to the second area.

For example, the memory controller 551 may control access of an external component to content stored in the memory 550. According to various embodiments, a first controller and a second controller of the memory controller 551 may enable access to the first area of the content stored in the memory 550, and disable access to the second area of the content, based on the received flag.

For example, the image processor 552 may edit and/or modify an image according to a preset or user-selected scheme for the stored content. For example, the image processor 552 may perform encoding, decoding, and the like on the stored content. According to various embodiments, while activating a first image processor for performing an image process on the first area of the stored content, the image processor 552 may deactivate a second image processor for performing an image process on the second area of the content.

Figure 6:
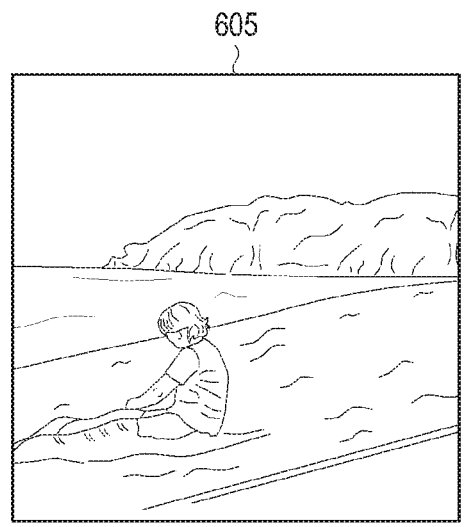
FIGS. 6 and 7 are diagrams illustrating example content and a display according to various example embodiments of the present disclosure.
Figure 7:
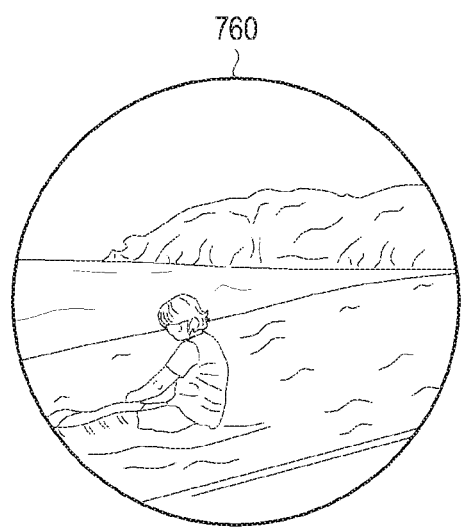

FIGS. 6 and 7 are diagrams illustrating example content and a display according to various example embodiments of the present disclosure.

Referring to FIGS. 6 and 7, according to various example embodiments, a processor (for example, the processor 510) may generate square content 605, and identify and/or compare the shape of the content 605 and the shape of a display 760.

Figure 8:
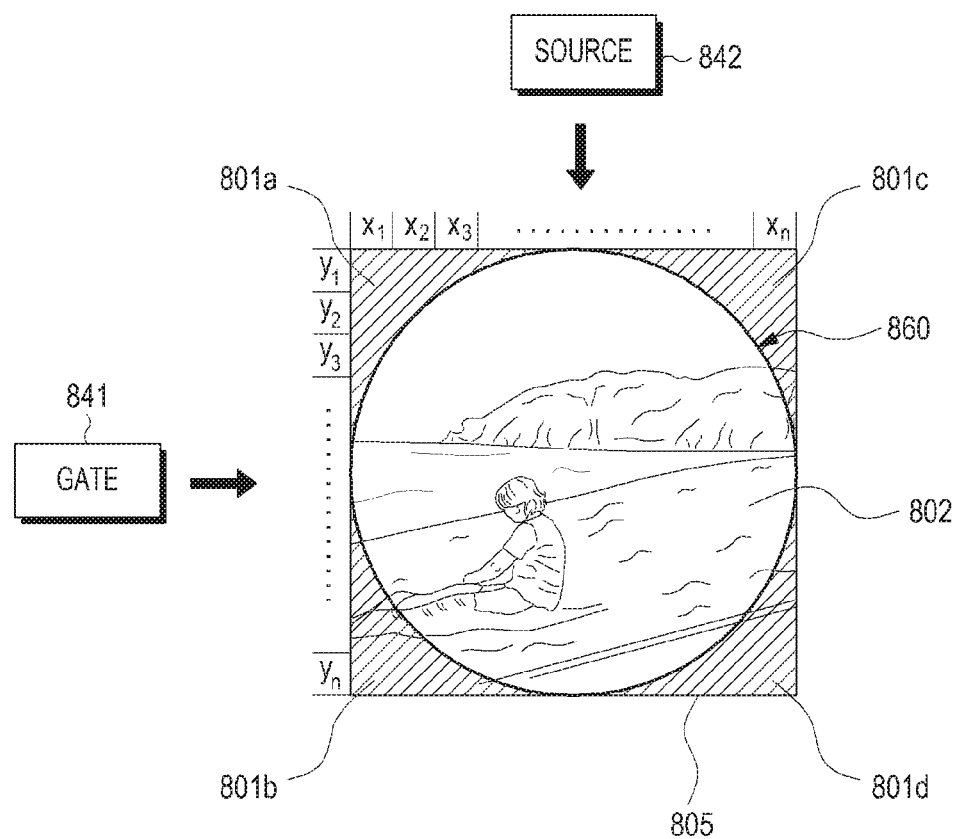
FIG. 8 is a diagram illustrating an example operation for determining a first area and a second area, and accordingly deactivating at least a part of a first driver and a second driver according to various example embodiments of the present disclosure.

FIG. 8 is a diagram illustrating an example operation for determining a first area and a second area, and deactivating at least part of a first driver and a second driver based on the determination according to various example embodiments of the present disclosure.

Referring to FIG. 8, according to various example embodiments, a display driving unit may control timing signals of a gate driver 841 and/or data signals of a source driver 842 through a display driving unit.

For example, content 805 may include a square area to be displayed. For example, the content 805 may include a first area 802 to be displayed on a display 860, and a second area 801a, 801b, 801c, and 801d to not be displayed on the display 860.

According to various embodiments, the source driver 842 for outputting a driving signal to drive the circular display 860 may include n horizontal channels, $x_1, x_2, x_3 \ldots x_n$, and the gate driver 841 may include n vertical channels, $y_1, y_2, y_3 \ldots y_n$.

For example, the display driving unit may apply timing signals y1 to yn through the gate driver 841 according to a time order preset for the channels $y_1, y_2, y_3 \ldots y_n$, and apply data signals to the channels $x_1, x_2, x_3 \ldots x_n$ based on an already-generated flag (a result of comparing the first area with the second area).

Figure 9:
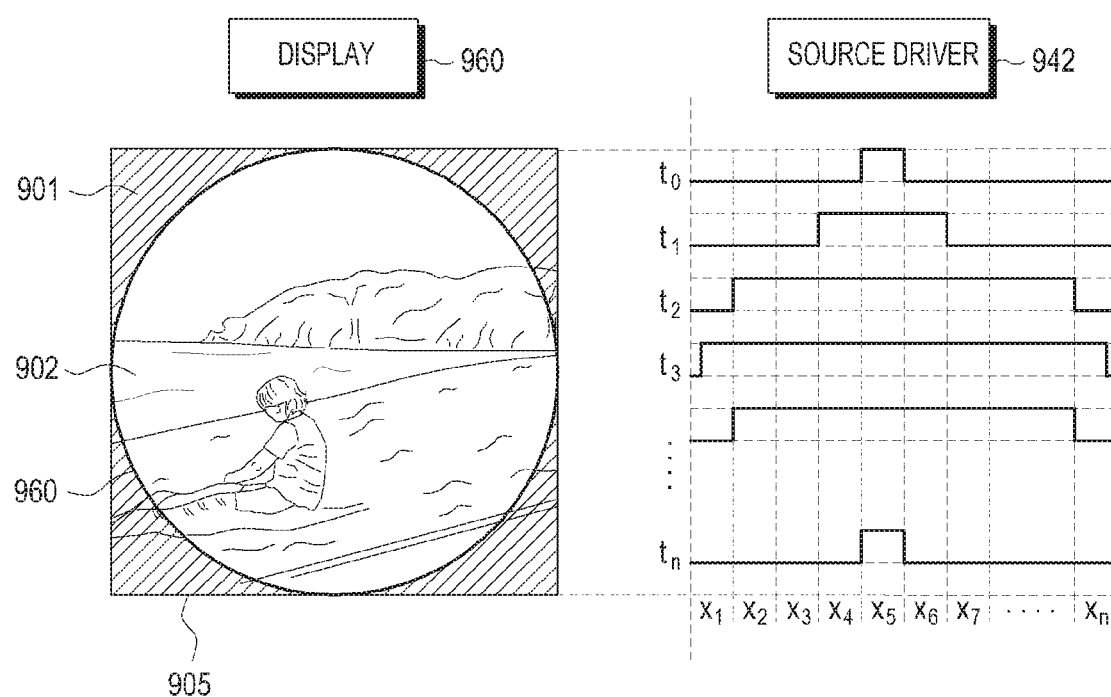
FIG. 9 is a diagram illustrating an example driving principle of a source driver according to various example embodiments of the present disclosure.

FIG. 9 is a diagram illustrating an example driving principle of a source driver according to various example embodiments of the present disclosure.

Referring to FIG. 9, according to various example embodiments, a display 960 may display a first area 902 of content 905, without displaying a second area 901 of the content 905. This is apparent to those skilled in the art because the display 960 is shaped into a circle as compared to the square shape of the content 905.

For example, a display driving unit may control a source driver 942 to output a data signal function using a part of the plurality of channels of the source driver 942 at time to $t_0$ time $t_5$.

For example, at $t_0$, while activating some transistors required to apply a first data signal function among channels $x_1, x_2, x_3 \ldots x_n$ of the source driver 942 based on a received flag (or a result of comparing the first area with the second area), the display driving unit deactivates the remaining transistors that are not required for applying the first data signal function.

For example, at $t_1$, while activating some transistors required to apply a second data signal function using more channels than the number of channels required for outputting the first data signal function among the channels $x_1, x_2, x_3 \ldots x_n$ of the source driver 942 based on the received flag (or the result of comparing the first area with the second area), the display driving unit deactivates the remaining transistors that are not required for applying the second data signal function.

For example, at $t_2$, while activating some transistors required to apply a third data signal function using more channels than the number of channels required for outputting the second data signal function among the channels $x_1, x_2, x_3 \ldots x_n$ of the source driver 942 based on the received flag (or the result of comparing the first area with the second area), the display driving unit deactivates the remaining transistors that are not required for applying the third data signal function.

For example, at $t_3$, the display driving unit may deactivate the remaining transistors except for some transistors required for applying a fourth data signal function to be output using more channels than the number of channels used to output the third data signal function based on the flag (or the result of comparing the first area with the second area) transmitted to the transistors corresponding to the channels $x_1, x_2, x_3 \ldots x_n$ of the source driver 942. At $t_n$, while activating some transistors required to apply a fifth data signal function to be output using fewer channels than the number of channels required for outputting the fourth data signal function based on the flag (or the result of comparing the first area with the second area) transmitted to the transistors corresponding to the channels $x_1, x_2, x_3 \ldots x_n$ of the source driver 942, the processor may deactivate the remaining transistors that are not required for applying the fifth data signal function.

Figure 10:
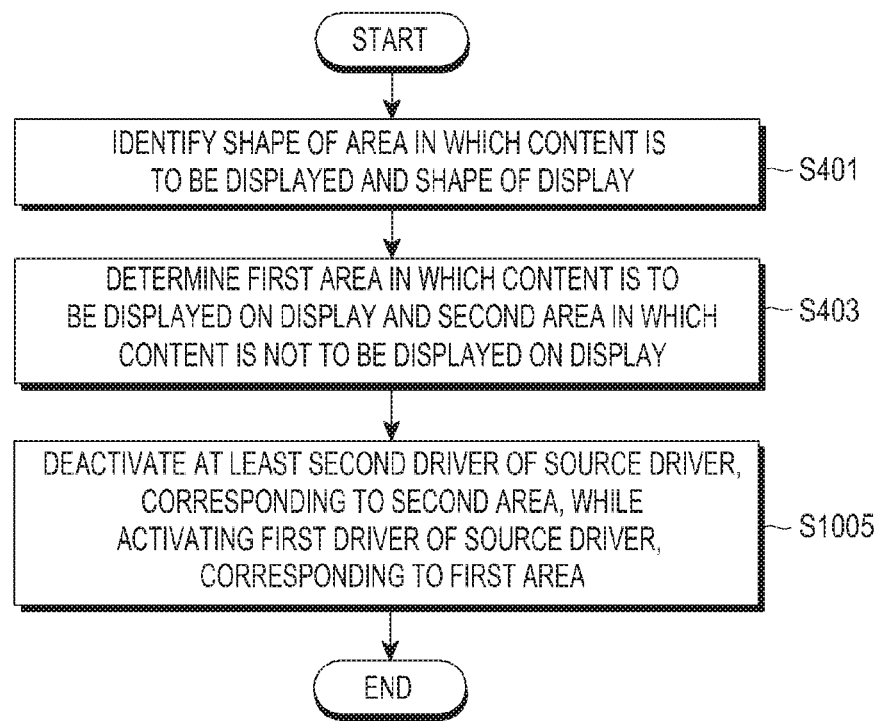
FIG. 10 is a flowchart illustrating an example method of controlling an electronic device according to various example embodiments of the present disclosure.

FIG. 10 is a flowchart illustrating an example method of controlling an electronic device according to various example embodiments of the present disclosure.

Referring to FIG. 10, according to various example embodiments, after operations S401 and S403 of FIG. 4, while activating a first driver of a source driver (for example, the source driver 542) corresponding to a first area (for example, the first area 802), a display driving unit may deactivate a second driver corresponding to a second area (for example, the second area 801) in operation S1005.

Figure 11:
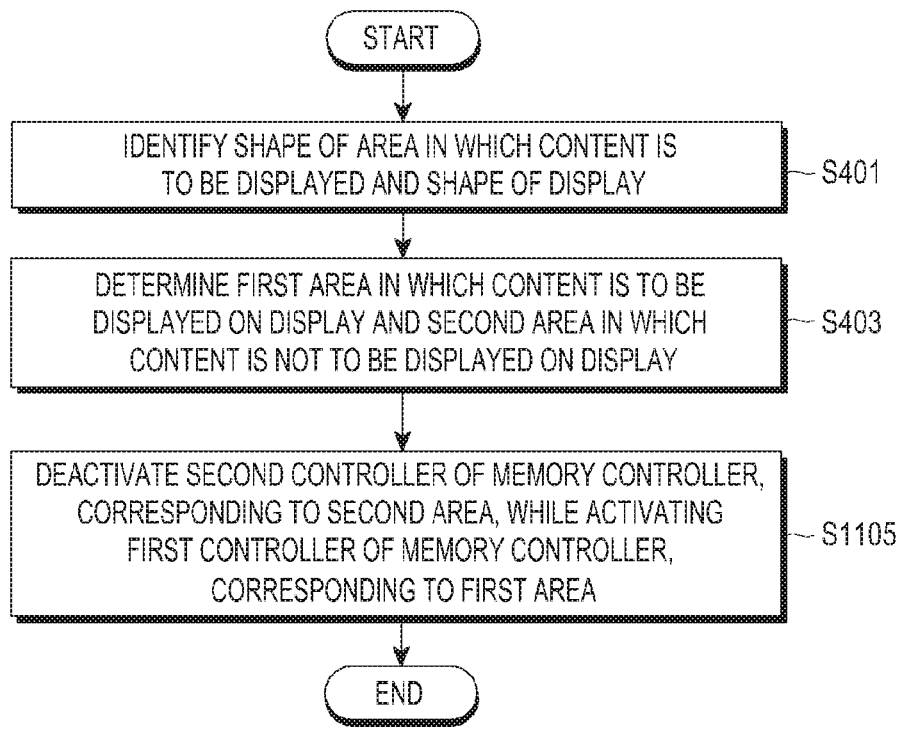
FIG. 11 is a flowchart illustrating an example method of controlling an electronic device according to various example embodiments of the present disclosure.

FIG. 11 is a flowchart illustrating an example method of controlling an electronic device according to various example embodiments of the present disclosure.

Referring to FIG. 11, according to various example embodiments, after operations S401 and S403 of FIG. 4, while activating a first controller of a memory controller (for example, the memory controller 551) corresponding to a first area (for example, the first area 802), a processor (for example, the processor 510) may deactivate a second controller corresponding to a second area (for example, the second area 801) in operation S1105.

For example, while activating the first controller for controlling access to the first area 802 in the area of content, the display driving unit may deactivate the second controller for controlling access to the second area 801 in the area of the content.

The operation will be described in greater detail below with reference to FIG. 12.

Figure 12:
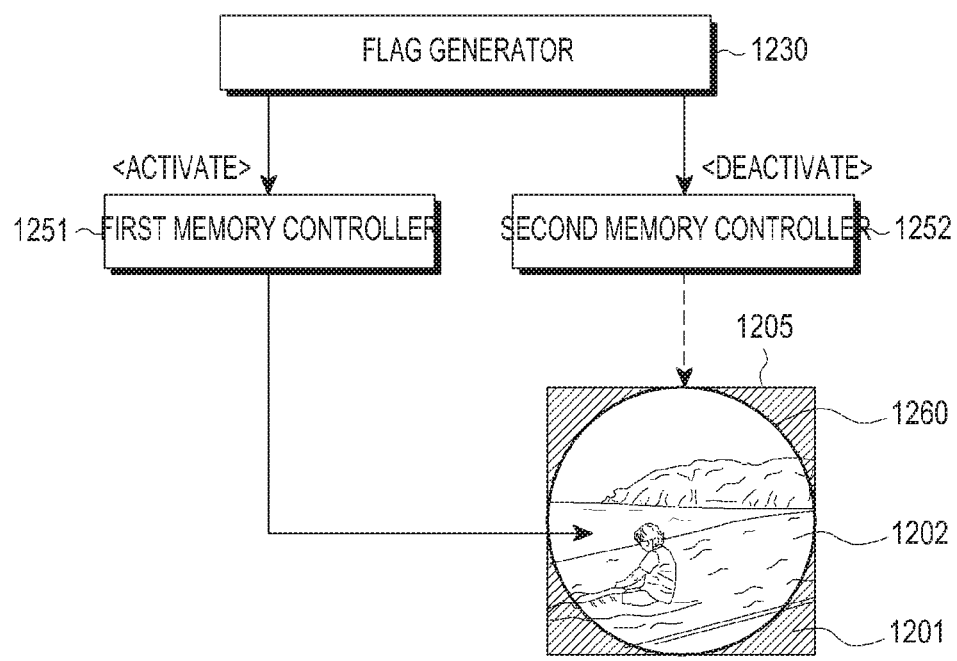
FIG. 12 is a diagram illustrating an example method of controlling memory access according to various example embodiments of the present disclosure.

FIG. 12 is a diagram illustrating an example method for controlling access to a memory according to various example embodiments of the present disclosure.

Referring to FIG. 12, for example, a flag generator 1230 may generate a flag based on a result of comparing a first area 1202 of the area of content 1205, to be displayed on a display 1260 with a second area 1201 of the area of the content 1205, not to be displayed on the display 1260.

For example, the flag generator 1230 may transmit the generated flag to a first memory controller 1251 for controlling access to the first area 1202, and a second memory controller 1252 for controlling access to the second area 1201, in a memory controller (for example, the memory controller 551).

For example, although the first memory controller 1251 may access the first area 1202 of the content 1205 based on the acquired flag, the second memory controller 152 is not capable of accessing the second area 1201 of the content 1205 because the second memory controller 1252 has been deactivated based on the acquired flag.

For example, the display driving unit may control access to a part of an external memory that stores content.

Figure 13:
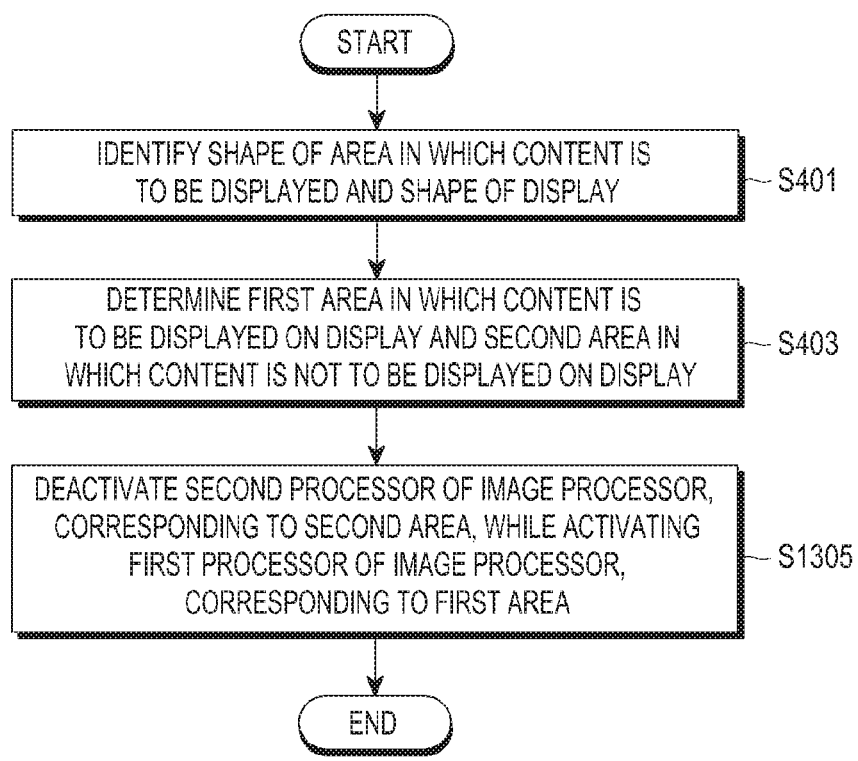
FIG. 13 is a flowchart illustrating an example method of processing an image according to various example embodiments of the present disclosure.

FIG. 13 is a flowchart illustrating an example image processing method according to various example embodiments of the present disclosure.

Referring to FIG. 13, according to various example embodiments, after operations S401 and S403 of FIG. 4, while activating a first processor of an image processor, corresponding to a first area (for example, the first area 802), a display driving unit may deactivate a second processor of the image processor, corresponding to a second area (for example, the second area 801) in operation S1305.

Figure 14:
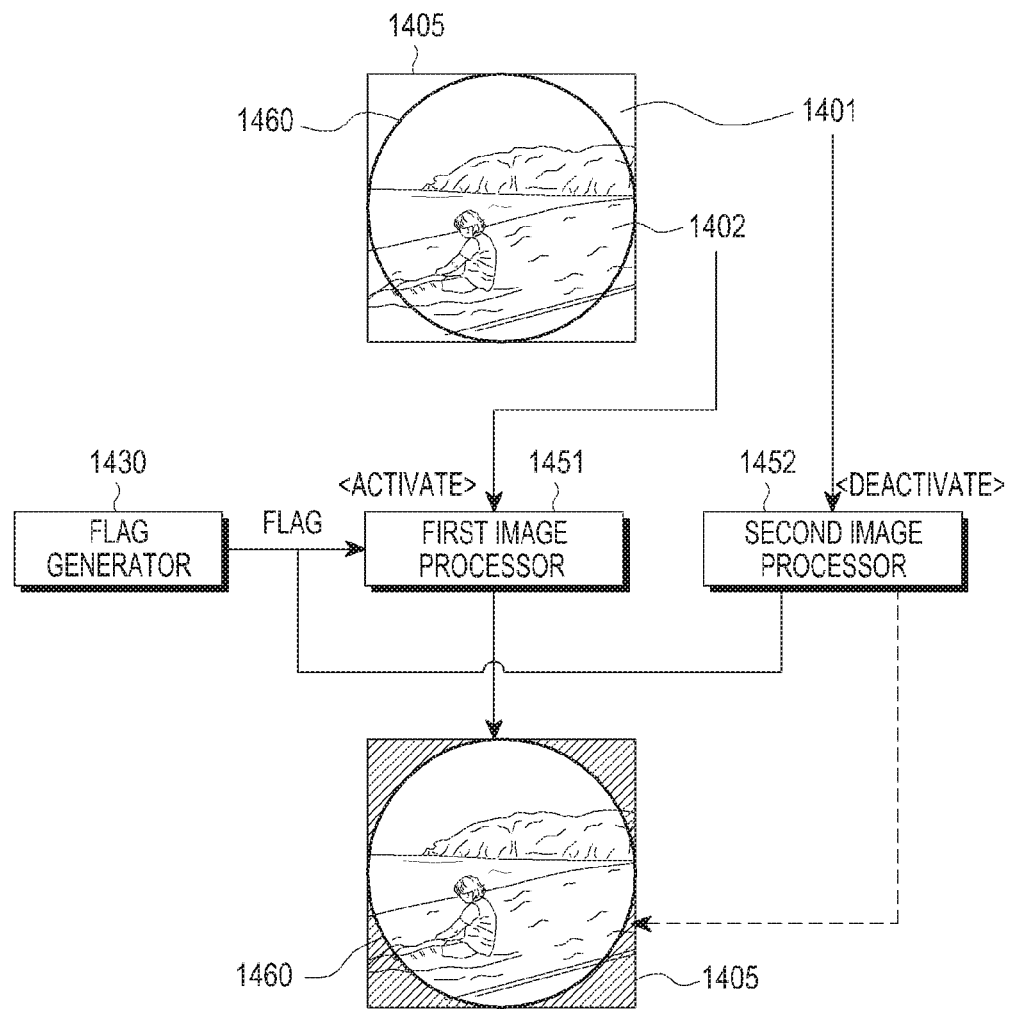
FIG. 14 is a diagram illustrating an example method of processing an image according to various example embodiments of the present disclosure.

FIG. 14 is a diagram illustrating an example image processing method according to various example embodiments of the present disclosure.

Referring to FIG. 14, according to various example embodiments, a flag generator 1430 may generate a flag that distinguishes a first area 1402 from a second area 1401, and transmits the generated flag to a first image processor 1451 and a second image processor 1452.

For example, the first image processor 1451 for performing an image process on the first area 1402 to be displayed on the display 1460 may perform the image process on the first area 1402 of content 1405 according to a predetermined condition.

For example, the second image processor 1452 for performing an image process on the second area 1401 not to be displayed on the display 1460 may not perform the image process on the second area 1401 of the content 1405 according to a predetermined condition, because the second image processor 1452 has been deactivated.

According to various example embodiments of the present disclosure, an electronic device comprising, a substantially circular or oval display, a processor configured to generate content, a display driving unit comprising display driving circuitry including a first driver and a second driver, wherein the display driving unit is configured to control driving of the display, to identify a shape of an area of content to be displayed in the display, to identify a shape of the display, to determine a first area of the display in which the content is to be displayed, to determine a second area of the display in which the content is not to be displayed based on at least a result of the identification, to deactivate at least part of the display driving unit, corresponding to the second area, while activating the display driving unit corresponding to the first area.

According to various example embodiments, the display driving unit may be configured to select a part of the first area and the second area by at least part of the determination operation.

According to various example embodiments, the display driving unit may be configured to control access of the at least part of the display driving unit to the memory.

According to various example embodiments, the display driving unit may be configured to control processing of the content at the at least part of the display driving unit.

According to various example embodiments, the display driving unit may be configured to control output data of the first driver of the display driving unit.

According to various example embodiments of the present disclosure, a method for controlling an electronic device including a display, a display driving unit comprising display driving circuitry including a first driver and a second driver, for controlling driving of the display, and a memory for storing content to be displayed on the display includes identifying the shape of an area of content which is displayed in the display, and a shape of the display, determining a first area in which the content is to be displayed on the display and a second area in which the content is not to be displayed on the display, at least based on a result of the identification, and deactivating at least part of the display driving unit, corresponding to the second area, while activating the display driving unit corresponding to the first area.

According to various example embodiments, at least part of the determination may include selecting a part of the first area and the second area.

According to various example embodiments, the method may further include controlling access the at least part of the display driving unit to the memory.

According to various example embodiments, the method may further include controlling processing of the content at the at least part of the display driving unit.

According to various example embodiments, the method may further include controlling output data of the first driver of the display driving unit.

According to various example embodiments of the present disclosure, a computer-readable storage medium storing a program that, when executed by at least one processor, causes the at least one processor to generate content, and causes a display driving unit including a first driver and a second driver to perform at least one operation, the at least one operation comprising, identifying a shape of an area of content to be displayed in the display, identifying a shape of the display, determining a first area of the display in which the content is to be displayed and a second area of the display in which the content is not to be displayed based at least on a result of the identifying, and deactivating at least part of a display driving unit for the display, corresponding to the second area, while activating the display driving unit corresponding to the first area.

According to various example embodiments, at least part of the determination may include selecting a part of the first area and the second area.

According to various example embodiments, the at least one operation may further include controlling processing of the content at the at least part of the display driving unit.

According to various example embodiments, the at least one operation may further include controlling access of the at least part of the display driving unit to the memory.

According to various example embodiments, the at least one operation may further include controlling output data of a first driver of the display driving unit.

According to various example embodiments of the present disclosure, an electronic device includes a display, a processor configured to generate content, a memory for storing content to be displayed on the display, and a display driving unit comprising display driving circuitry including a first driver and a second driver, wherein the display driving unit is configured to control driving of the display, to identify a shape of an area of content to be displayed in the display, to determine a first area of the display in which the content is to be displayed and a 10 second area of the display in which the content is not to be displayed based on at least a result of the identifying, to deactivate at least part of the display driving unit, corresponding to the second area, while activating the display driving unit corresponding to the first area.

According to various example embodiments, the display driving unit may be configured to select a part of the first area and the second area by at least part of the determination operation.

According to various example embodiments, the display driving unit may be configured to control access of the at least part of the display driving unit to the memory.

According to various example embodiments, the display driving unit may be configured to control processing of the content at the at least part of the display driving unit.

According to various example embodiments, the display driving unit may be configured to control output data of the first driver of the display driving unit.

As is apparent from the foregoing description, an electronic device according to various example embodiments of the present disclosure may control a display to not display an area of content which is not supposed to be displayed on the display. Therefore, unnecessary power consumption of a wearable device can be reduced, and a user can reproduce content on the wearable device for a relatively long time.

The various example embodiments disclosed in the present disclosure are provided for description and to aid in understanding of the present disclosure, and is not intended to limit the scope of the present disclosure. Accordingly, the scope of the present disclosure should be understood as embracing all modifications or various example embodiments within the scope of the present disclosure therein.

What is claimed is:

1. An electronic device comprising:
   a substantially circular or oval display panel;
   a processor configured to generate an image; and
   a display driving unit comprising: a gate driver, a source driver, an image processor, and a memory controller for controlling a memory;
   wherein the display driving unit is configured to:
   identify a first part of the image not to be displayed on the display panel based on a shape of the display panel,
   based on the identifying, deactivate at least one of a part of the memory controller corresponding to the first part of the image or a part of the image processor corresponding to the first part of the image, while displaying a second part of the image on the display panel using a part of the memory controller corresponding to the second part of the image and a part of the image processor corresponding to the second part of the image.

2. The electronic device according to claim 1, wherein the memory is configured to store the image to be displayed on the display panel, and wherein in response to the at least one of the part of at least one of the memory controller or the part of the image processor being deactivated a part of the memory corresponding to the first part of the image is not accessed.

3. A method of controlling an electronic device including a processor for generating an image, a substantially circular or oval display panel, a display driving unit comprising a gate driver, a source driver, an image processor, and a memory controller for controlling a memory, the method comprising:
   identifying a first part of the image not to be displayed based on a shape of the display panel; and
   based on the identifying, deactivating at least one of a part of the memory controller corresponding to the first part of the image or a part of the image processor corresponding to the first part of the image, while displaying a second part of the image on the display panel using a part of the memory controller corresponding to the second part of the image and a part of the image processor corresponding to the second part of the image.

4. The method according to claim 3, wherein in response to the at least one of the part of the memory controller or the part of the image processor being deactivated, a part of the memory corresponding to the first part of the image is not accessed.

5. A non-transitory computer-readable storage medium storing a program which, when executed by at least one processor, causes the at least one processor to generate an image, and causes a display driving unit including a gate driver, a source driver, an image processor, and a memory controller for controlling a memory, to perform at least one operation, the at least one operation comprising:
   identifying a first part of the image not to be displayed on a substantially circular or oval display panel based on a shape of the display panel; and
   based on the identifying, deactivating at least one of a part of the memory controller corresponding to the first part of the image or a part of the image processor corresponding to the first part of the image, while displaying a second part of the image on the display panel using a part of the memory controller corresponding to the second part of the image and a part of the image processor corresponding to the second part of the image.

6. The non-transitory computer-readable storage medium according to claim 5, wherein in response to the at least one of the part of the memory controller or the part of the image processor being deactivated, a part of the memory corresponding to the first part of the image is not accessed.

7. An electronic device comprising:
   a substantially circular or oval display panel;
   a processor configured to generate an image;
   a memory for storing the image to be displayed on the display panel; and
   a display driving unit comprising a gate driver, a source driver, an image processor, and a memory controller for controlling the memory;
   wherein the display driving unit is configured to:
   identify a first part of the image not to be displayed on the display panel based on a shape of the display panel, and
   based on the identifying, deactivate at least one of a part of the memory controller corresponding to the first part of the image or the part of the image processor corresponding to the first part of the image while displaying a second part of the image on the display panel using a part of the memory controller corresponding to the second part of the image and a part of the image processor corresponding to the second part of the image.

8. The electronic device according to claim 7, wherein in response to the at least one of the part of the memory controller or the part of the image processor being deactivated, a part of the memory corresponding to the first part of the image is not accessed.

* * * * *